United States Patent [19]

Hessenthaler

[11] Patent Number: 4,854,051
[45] Date of Patent: Aug. 8, 1989

[54] JIG FOR ALIGNING CUTTER BLADES

[76] Inventor: George D. Hessenthaler, 585 W. 3900 South, Murray, Utah 84123

[21] Appl. No.: 194,048

[22] Filed: May 13, 1988

[51] Int. Cl.⁴ ............................................. B27G 23/00
[52] U.S. Cl. ........................................ 33/628; 33/633
[58] Field of Search ................ 33/628, 626, 630, 633, 33/634, 635, DIG. 1

[56] References Cited

U.S. PATENT DOCUMENTS 2,286,664  6/1942  Anderson ............... 33/DIG. 1 X
2,700,993  2/1955  Pence ............................. 33/628 X
3,200,507  8/1965  Rivard ................................. 33/633

Primary Examiner—Harry N. Haroian
Attorney, Agent, or Firm—B. Deon Criddle

[57] ABSTRACT

A jig for aligning cutter blades including positioning bars each with a holding magnet insert at one end thereof to engage and hold blades of a cutter head of a woodworking machine as the blades are locked in place and stabilizing magnets spaced along the other end of each positioning bar; and means to adjust the relative spacing between positioning bars while maintaining such bars in a parallel relationship.

3 Claims, 1 Drawing Sheet

JIG FOR ALIGNING CUTTER BLADES

BACKGROUND OF THE INVENTION

It is common practice to set the knives in woodworking machine cutter heads to a height corresponding to that of a discharge work surface of the machine. Wood stock being processed is then fully supported as it is passed over the cutting knife and across the discharge surface.

With the stock supported on the discharge working surface the cutting depth of the knife is limited and the knife produces a smooth uniform surface. It is, however, critical that the knife cutting edge be perfectly aligned to the discharge working surface so that after the knife has cut the stock, the stock will be adequately supported by the discharge surface in the same plane as the knife cutting edge and no further cutting will occur.

The operator selects the depth the knife is to cut by pre-setting the feed side working surface at an appropriate depth below the level of the discharge working surface. The difference between the height of the two surfaces becomes the depth of cut when the knives are properly set.

Due to the frequent need to change knives for sharpening, cleaning, etc., it is very desirable to be able to quickly set the alignment of knife cutting edge to the discharge working surface. In the past a variety of jigs or setting gauges have been used for this procedure.

Machines such as jointers, which employ standard cutter heads, are manufactured in various cutting widths. The recent introduction and popularity of solid carbide and carbide topped knives, in addition to heavy industrial grade cutting knives adds to the difficulty in re-setting knives in the cutter head.

FIELD OF THE INVENTION

This invention relates to jigs for the setting and alignment of knife edges and is particularly concerned with the setting and alignment of knives mounted in the cutter heads of both large and small woodworking machines.

PRIOR ART

Jigs and knife gauges have long been available for setting knives of woodworking equipment such as jointers. These are generally micrometer calibrated to permit a user to achieve accurate blade setting.

In the past others have patented tools for setting the knives of woodworking tools. U.S. Pat. No. 2,589,865 shows a wood planer blade setting gauge that uses an electromagnet carried by adjustable support members to hold a blade as it is set. U.S. Pat. No. 2,700,993 shows a jointer knife setting tool wherein a pair of elongate permanent magnets are held on adjustably spaced parallel distance apart by parallel arms. U.S. Pat. No. 3,200,507 discloses a jointer knife setting tool wherein a plastic body carries a pair of spaced apart magnets that are provided to anchor the tool to a jointer table and a pair of spaced apart holding magnets are used to hold a knife edge.

BRIEF DESCRIPTION

SUMMARY OF THE INVENTION

This invention provides a new and improved jig for magnetically positioning and holding knife blades of all sizes and weights, whether or not the blade is solid carbide, carbide tipped, extra heavy or standard high speed tool steel. The jig magnetically suspends each knife in position with the knife edge aligned to the same plane as the discharge work surface of a woodworking machine. Jig width adjustment means are provided to allow the jig to accomodate knives of different lengths, as well as to provide open access to an area in which an operator may adjust the clamping means, while holding a knife in suspended psoition. The knife held in this suspended position surface.

Markings are pemanently provided on a jig rear bar. Component to insure alignment with markings on the feed table and fence guide of the woodworking machine and accurate blade placement.

OBJECTS OF THE INVENTION

The present invention provides an improved method and apparatus for the alignment of knife edges to the discharge work surfaces by holding the knives by their cutting edges with magnets, in the same plane as the discharge working surface. Means are provided for adjusting the jig to allow one jig to service knives of different sizes. The adjustment means can also be used to size the jig as necessary to permit access to operate knife clamping means through the jig.

Other objects are to provide means for holding knife blades of woodworking machines of all sizes and weights whether or not the knives are solid carbide, carbide tipped, standard or extra heavy high speed tool steel.

FEATURES OF THE INVENTION

Principal features of the invention include two individual bars having stabilizing magnetic inserts that are positioned on the discharge work surface of a woodworking machine. One end of each bar is cantilevered beyond a discharge work surface over a knife cutting head which supports individual cutting knives. Holding magnetic inserts on the bottom surface of the bars are flush with the discharge work surface and similar magnetic inserts hold the cutting edges of the knives to the plane of the discharge work surface. The holding magnetic inserts are preferably made of magnets capable of supporting even solid carbide, carbide tipped, standard or extra heavy steel knives.

Another feature of the invention is in the use of multiple adjustment rods which are provided to allow for adjustments to be made for accomodating various knife lengths. The rods are readily changed and are provided in selected lengths to accomodate blades of different lengths and to insure positioning of at least fifty percent of the blade length between holding magnetic inserts.

Score marks are machined on the jig (and are transferred to the fence and discharge work surface of woodworking machine) to permit easy and rapid positioning of the jig on the discharge work surface at the appropriate location to allow the knife to be re-set at top dead center. Alignment of the cutting knives with the proper score marks on the jig assures that the knives will be set in the correct plane and at the high point of cutterhead rotation. For jointers having adjustable outfeed tables an index mark across relatively movable components allows them to be aligned so that the use of the index marks described above will be effective.

Other objects and features of the invention will become apparent from the following detailed description and drawing disclosing what are presently contemplated as being the best modes of the invention.

THE DRAWING

In the drawing:

FIG. 1 is a perspective view of the jig;

FIG. 2, a perspective view of the jig on a typical woodworking machine;

FIG. 3, a cross section view of the jig, taken on the line 3—3 of FIG. 1; and

FIG. 4, a longitudinal section through the jig and woodworking machine, taken on line 4—4 of FIG. 2.

DETAILED DESCRIPTION

Figure 1:
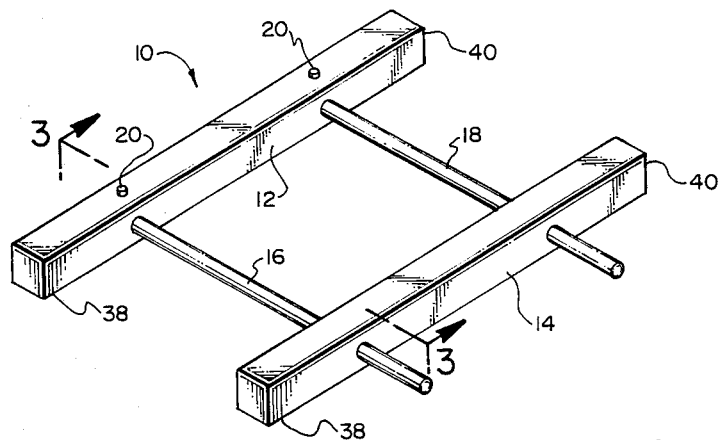
Figure 3:
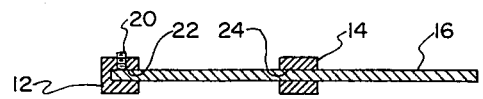

Referring now to the drawings:

In the illustrated preferred embodiment, the jig of the invention is shown generally at 10. The jig includes two bars 12 and 14 (here shown as having a square cross-sectional configuration) that are aligned parallel to each other and that are held parallel by at least two adjustment rods 16 and 18. The rods are fitted into holes provided therefor in bar 12 and slidably through holes in bar 14. Set screws 20 are tapped into bar 12 and provide a means to lock the adjustment rods 16 and 18 to the bar 12. As shown best in FIG. 3, holes 22 extend into bar 12 to receive the ends of rods 16 and 18, with the rods then extending normal to a longitudinal axis of the bar. Bar 14 has holes 24 bored fully through the bar to provide means for sliding bar 14 along rods 16 and 18 to any desired location. Rods 16 and 18 thus also extend normal to the longitudinal axis of bar 14. The sledable adjustment of bar 14 along rods 16 and 18 makes it possible for the jig to fit and be used with a variety of machines of different sizes.

Figure 4:
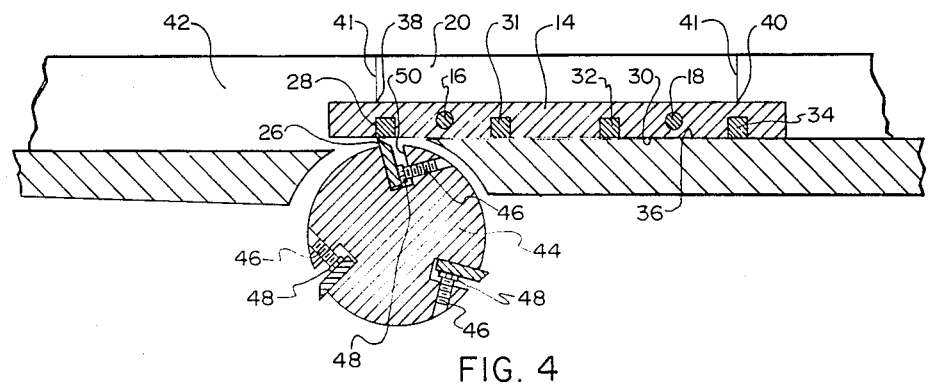
Figure 1:
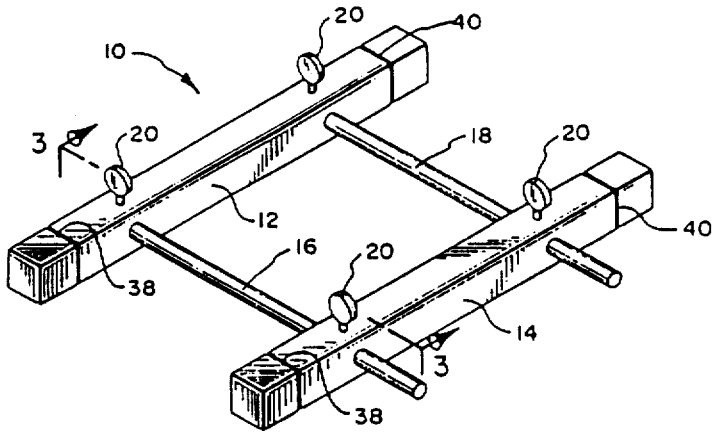
Figure 2:
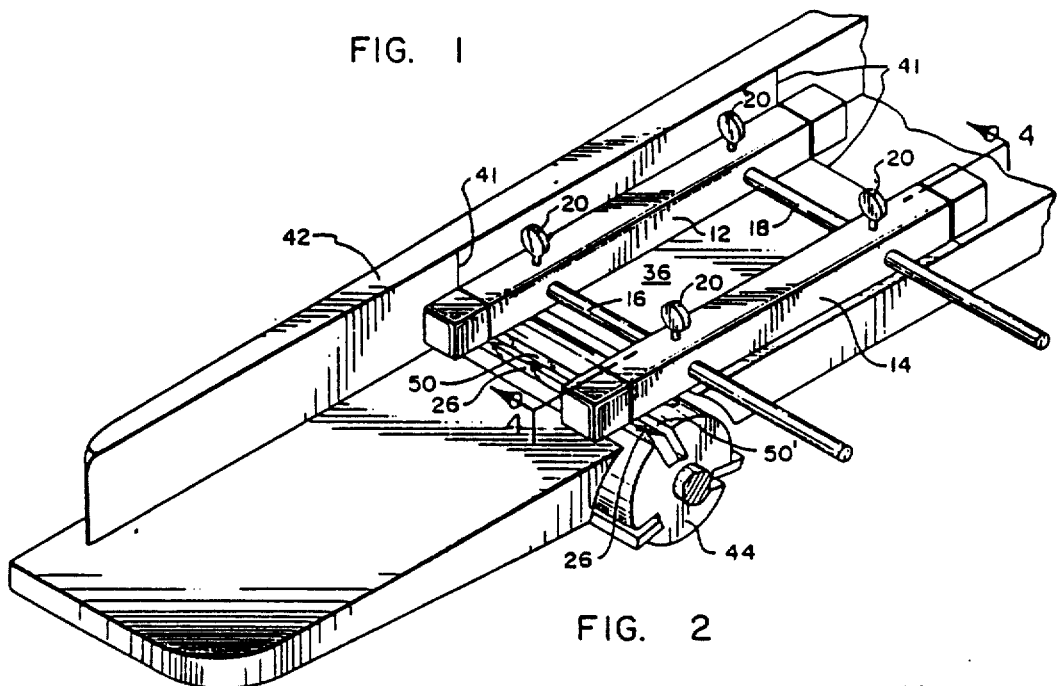
Figure 3:
Figure 4:
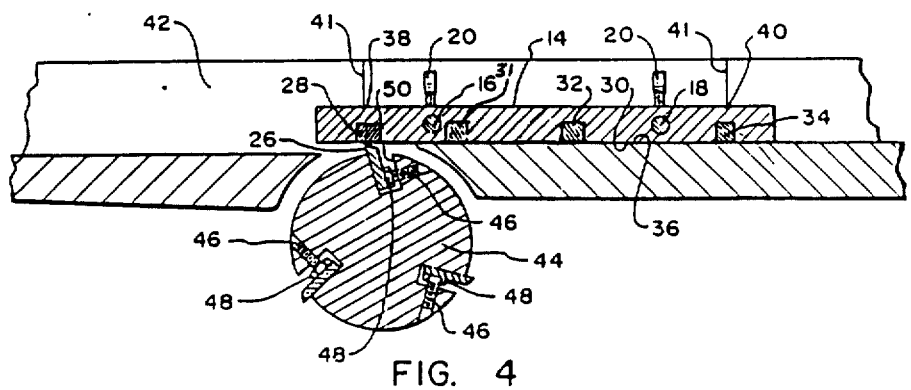

The longitudinal section view of FIG. 4 shows the bar 14 in a normal position with one end cantilevered over a cutting head of a wood cutting machine. Bar 12, as noted, extends parallel to bar 14 and acts in tandem with bar 14 to support the knife in at least two locations. It has been found that for effective holding the knife blades must be supported such that at least fifty percent of the knife length is between the bars 14. In FIG. 4 a knife 26 is shown magnetically attached to and held by holding magnet 28. Holding magnet 28 is recessed into bar 14 so that an exposed surface thereof is flush with an underside surface 30 of bar 14. The underside surface 30 also is shown with three stabilizing magnetic members 31, 32 and 34 which are recessed into bar 14 and that have exposed surfaces flush with the underside surface 30. Bar 12 has a corresponding holding magnet and stabilizing magnets 28, 31, 32 and 34, not shown, recessed therein. The stabilizing magnets 31, 32 and 34 help to hold bars 14 and 16 firmly on the ferrous metal discharge working surface 36 and counter the rotational effect caused by the engagement of the holding magnets with a blade. Furthermore, the rectangular configuration formed by the bars and rods will readily support the addition of weights thereon so that the device can be held in place, even on non-ferrous tables. Most cutter heads of woodworking machines have multiple knives mounted therein and it is important that each knife be aligned to project the same distance from the head.

Because the knife blades may be heavy, particularly when used for larger woodworking machines, it has been found that at least three stabilizing magnets should be used. Also, because carbide tipped or solid carbide knives are employed at an increasing rate, suitable rate earth magnets, can be used to suspend the carbide knives, as well as steel knives. Conventional permanent magnets such as those made of alnico, can be used where the holding power of a suitable rare earth magnet is not required to hold carbide knives.

Figure 2:
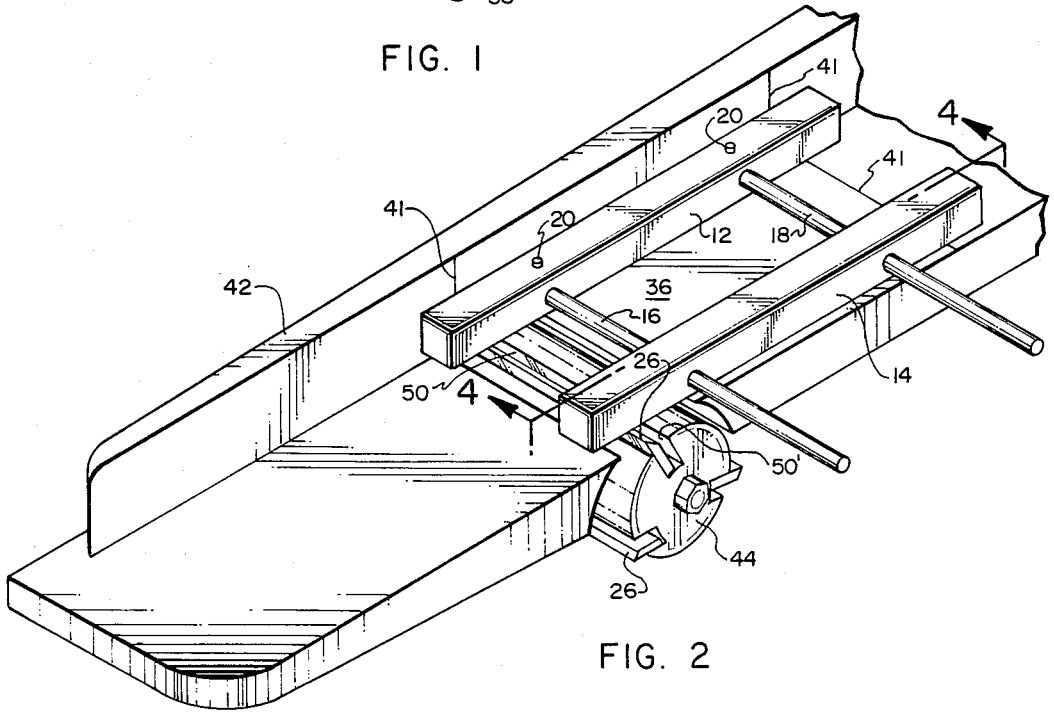

Bar 12 has score marks 38 and 40 thereon, located near the ends of the bar and aligned with the centerlines of the holding magnet and the most remote stabilizing magnetic member. Corresponding marks 41 may be described along the fence 42 or on the discharge working surface 36 as shown in FIG. 2. By aligning the score marks 38 and 40 with marks 41 thus, if the out-feed table is variable, top dead center is achieved when the marks on the jointer frame and table are brought into alignment the jig can be more quickly positioned to align the knife. The corresponding score marks scribed on the machinery and on the jig also help in positioning multiple knives on the cutter head 44 to the same position.

The positioning of the bars 12 and 14 with respect to cutter head 44 is important since bars 12 and 14 can be adjusted so as not to interfere with the knife set screw 46, which consists of a set screw with a hex end 48 that is tightened by inserting an end wrench into slots 50 on cutter head 44 and turning the hex end 48 of set screw 46 until sufficient pressure is obtained to hold knife 26 firmly in place whether the locking mechanism is a lock bar or a gibe. While the set screw 46 is here disclosed as having a hex end, it will be apparent that other screw ends, i.e., slotted Allen, or Phillips head, for example, can be used. Bars 12 and 14 can be positioned in a manner which permits access at various points along slot 50 to access the set screw hex ends 48 that are opened by turning them with an end wrench in slot 50. As shown best in FIG. 2 the portion of slot 50 between bars 12 and 14 allows access to set screw ends 48 and the portion of slot 50 extending beyond bar 14 identified as 50 allows access to another portion of slot 50, from which set screw hex ends 48 can be turned.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A jig for aligning cutter blades comprising
   a pair of spaced apart, parallel straight bars having a generally rectangular configuration and each having a flat undersurface in a common plane;
   means comprising spaced apart parallel metal rods each inserted into one of said bars and projecting therefrom and projecting through the other of said bars, holding said bars in spaced apart parallel relationship with the undersurfaces in said common plane;
   a plurality of stabilizing magnets spaced along each bar from one end thereof, said stabilizing magnets being equally spaced from one another along the bars and with a surface of each stabilizing magnet flush with the undersurface of the bar in which said magnet is mounted;
   a holding magnet inserted into each of said bars adjacent the other end thereof;
   a score mark formed on an inside surface and continued onto an upper surface of each end of one of said bars, the score mark on the other end being aligned with a centerline through the holding magnet, and the score lines at each end of the bar being adapted to be aligned with a score mark on a fence of a cutter machine.

2. A jig as in claim 1, wherein the holding magnet is a rare earth magnet.

3. A jig as in claim 1, wherein the rods projecting through holes in the the other of said bars are inserted through holes in the bars having slightly larger diameter than the said rods.

* * * * *

UNITED STATES PATENT AND TRADEMARK OFFICE
CERTIFICATE OF CORRECTION

PATENT NO. : 4,854,051

DATED : August 8, 1989

INVENTOR(S) : George D. Hessenthaler

It is certified that error appears in the above-identified patent and that said Letters Patent is hereby corrected as shown below:

The sheet of drawings, consisting of Figs. 1-4, should be deleted to be replaced with the attached sheet of drawing consisting of Figs. 1-4.

Signed and Sealed this

Twenty-second Day of October, 1991

Attest:

*Attesting Officer*

HARRY F. MANBECK, JR.

*Commissioner of Patents and Trademarks*